United States Patent [19]

Nellessen et al.

[11] Patent Number: 5,914,006
[45] Date of Patent: Jun. 22, 1999

[54] PROCESS FOR CONTROLLING THE DEPOSIT OF ADHESIVE IMPURITIES FROM PAPER MATERIAL SUSPENSIONS

[75] Inventors: Bernhard Nellessen, Kaarst; Rita Koester, Duesseldorf; Klaus Hornfeck, Mettmann; Berthold Schreck, Duesseldorf; Peter Daute, Beverstedt, all of Germany

[73] Assignee: Henkel Kommanditgesellschaft auf Aktien, Duesseldorf, Germany

[21] Appl. No.: 08/945,494

[22] PCT Filed: Apr. 18, 1996

[86] PCT No.: PCT/EP96/01619

§ 371 Date: Oct. 24, 1997

§ 102(e) Date: Oct. 24, 1997

[87] PCT Pub. No.: WO96/34147

PCT Pub. Date: Oct. 31, 1996

[30] Foreign Application Priority Data

Apr. 26, 1995 [DE] Germany .......................... 195 15 273

[51] Int. Cl.⁶ .................................................. D21H 21/02
[52] U.S. Cl. ........................ 162/158; 162/179; 162/199; 162/DIG. 4
[58] Field of Search ................................. 162/5, 72, 158, 162/179, 199, DIG. 4

[56] References Cited

U.S. PATENT DOCUMENTS

| | | | |
|---|---|---|---|
| 3,081,219 | 3/1963 | Drennen et al. | 162/72 |
| 3,778,465 | 12/1973 | Barnstorf | 260/409 |
| 4,744,865 | 5/1988 | Dreisbach et al. | 162/168.1 |
| 4,871,424 | 10/1989 | Dreisbach et al. | 162/168.1 |
| 4,923,566 | 5/1990 | Shawki et al. | 162/135 |
| 5,221,433 | 6/1993 | Daute et al. | 162/5 |

FOREIGN PATENT DOCUMENTS

| | | |
|---|---|---|
| 857 364 | 10/1952 | Germany . |
| 20 21 530 | 11/1971 | Germany . |
| 60 239 589 | 11/1985 | Japan . |
| WO91/01405 | 2/1991 | WIPO . |
| WO96/01923 | 1/1996 | WIPO . |

OTHER PUBLICATIONS

Das Papier, 38(10A): V121–V125 (1984).
Das Papier, 40(10A): V52–62 (1986).
Wochenblatt fur Papierfabrikation, 5:162–70 (1993).
Wochenblatt fur Papierfabrikation, 8:310–13 (1990).
Eur Comm. Eur. Communities, 14011, 235–43 (1992).
Fat. Science Technology 93(1): 13–19 (1991).
M.S.Malinovskii, "Epoxides and their Derivatives", Sivon Press (1965) (book unavailable).
"Chemische Technologie", Carl Hanser Verlag, vol. 7, 131–32 (1986).

*Primary Examiner*—Peter Chin
*Attorney, Agent, or Firm*—Ernest G. Szoke; Wayne C. Jaeschke; Real J. Grandmaison

[57] ABSTRACT

A process for controlling the deposition of stickies from paper stock suspensions during papermaking by adding to the paper stock suspensions from 0.001% to 5.0% by weight based on the weight of fibrous paper stock, of alkoxylation products obtained by reaction of alkylene oxides with $C_{10-22}$ carboxylic acid derivatives or $C_{10-22}$ carboxylic acids containing functional groups with at least one OH group in the 9, 10, 13 or 14 position.

10 Claims, No Drawings

PROCESS FOR CONTROLLING THE DEPOSIT OF ADHESIVE IMPURITIES FROM PAPER MATERIAL SUSPENSIONS

BACKGROUND OF THE INVENTION

1. Field of the Invention

This invention relates to a process for controlling the deposition of stickies from paper stock suspensions in papermaking.

2. Discussion of the Invention

Even when paper was invented in the second century, the use of waste material, i.e. the technique of—at least partial—recycling, played a certain part. In today's world, considerable significance is attributed to recycling technology because of the increase in ecological awareness. Accordingly, questions of raw materials supply and the avoidance of waste are becoming increasingly important in the steadily increasing production of paper.

By using secondary fibres through the recycling of waste paper, savings can be now be made in regard to raw materials, waste disposal space and the energy involved in papermaking. However, this technology is attended by specific difficulties.

Thus, in the processing of wastepaper, tacky impurities known as stickies can seriously disrupt the production process and adversely affect the quality of the paper produced. Stickies enter the papermaking process when the wastepaper used contains glued bindings, adhesive tape or specially treated products, such as coated, laminated or coated papers or paperboards. In addition, however, stickies can be formed by the rosin in wood and by its interaction with paper auxiliaries.

If the stickies are present in compact form, they can be chemically removed relatively easily by means of sorting machines. In general, however, the stickies are present not only in compact form, but also in dispersed form in the pulp and are very difficult to remove in this form. Accordingly, the increasing use of wastepaper in papermaking and the closing of the water circuits has increasingly resulted in an increase in the percentage content of stickies in the circuit water.

Stickies cause numerous problems and disruptions not only in the manufacture of paper, but also in the processing of paper. On account of their tackiness, deposits are formed on machine parts, pipe walls, wires, wet felts, dry felts, drying cylinders, smoothing rollers, calender rollers and also in the finished paper, resulting in web breaks in the papermaking machine and in a deterioration in paper quality through holes, specks, marks, etc. (cf. H. L. Baumgarten, Das Papier, 1984, 38, No. 10A, pages V121–V125) According to H. L. Baumgarten, stickies in industrial and institutional publications have for years been regarded as the biggest problem of reusing wastepaper. Even minimal quantities of adhesive can cause breaks in papermaking and printing machines so that stoppages for cleaning are unavoidable. Baumgarten says that "2 g adhesive introduced at an appropriate point of the papermaking machine can result in the rejection of several hundred kg paper" (loc. cit. page V122, right-hand column).

Stickies do not come from a single source. For the most part, they emanate from the rosin in wood, papermaking auxiliaries, binders for the coating of paper and paperboard, paper processing adhesives, printing ink binders and paper processing materials. Of particular importance in the context of the problem addressed by the present invention are the stickies which emanate from the rosin in wood and from the adhesives used in paper processing.

The rosins present in chemical pulp and mechanical pulp contain approximately 1 to 5% by weight of so-called harmful resins, depending on the type wood. These resins may be present in colloidally non-bound form or may adhere to the paper fibres. According to J. Weigl et al., the difficulties caused by rosin deposits in the manufacture and processing of paper have steadily increased over recent years for various reasons (cf. J. Weigl et al., Das Papier, 1986, pages V52–V62; more particularly page V53, left-hand column).

The adhesives used in the processing of paper can be divided into three groups, namely: pressure-sensitive adhesives, dispersion adhesives and hotmelt adhesives.

The pressure-sensitive adhesives are permanently tacky products. In their case, adhesion is achieved by application of pressure to the surfaces of the substrates to be bonded. The basic polymers typically used are selected from a number of basic substances in combination with corresponding additives, for example tackifying resins, plasticizers or antioxidants. Typical basic polymers are inter alia natural rubber, butyl rubber, styrene/butadiene copolymers (SBR rubber), acrylonitrile copolymers, polychloroprene, polyisobutylene, polyvinyl ether, acrylates, polyesters, polyurethanes, silicones.

In dispersion adhesives, the polymers used to form the adhesive layer are present as solid particles in an aqueous dispersion medium. In the production process, the basic monomers are first emulsified in an aqueous phase and then polymerized therein—a technique known as emulsion polymerization. The polymer is then present in the form of small particles with different particle sizes which may vary from molecularly disperse to coarsely disperse. In general, agglomeration and, hence, sedimentation of the polymer particles is counteracted by addition of protective colloids or emulsifiers to the system.

So-called hotmelt adhesives or "hotmelts" belong to the group of thermoplastics. Thermoplastics soften on heating and become fluid. On cooling, they solidify again. Examples of polymers used as hotmelt adhesives are polyamides, copolyamides, polyaminoamines, saturated polyesters and ethylene/vinyl acetate copolymers.

Stickies are divided into primary stickies and secondary stickies. Primary stickies are stickies which are not dispersed on account of their high resistance to wet size reduction. Accordingly, they are present in compact form and are easy to remove.

The existence of secondary stickies is attributable to the fact that, in the recovery of wastepaper, the stickies undergo a change in particle size which is brought about by thermal, chemical and mechanical influences. This means that even impurities which are still present in extremely coarse form at the beginning of the recovery process can undergo a more or less considerable reduction in size during the recovery of wastepaper. More particularly, stickies are dispersed by the operations taking place in the hot kneader used for wastepaper recovery. For example, stickies of low melting point are liquefied and then very finely dispersed. Friable or fragile stickies also break up into very small particles. The particle size of the dispersed stickies then extends from coarsely disperse via colloidally disperse to molecularly disperse.

In other words, many stickies are readily dispersible with the result that, after dissolution, they are present in finely divided form and are not picked up in the sorting process.

These substances are in danger of forming agglomerates known as secondary stickies in the papermaking machine through thermal, mechanical or chemical influences. It is precisely these secondary stickies which cause problems in the subsequent paper processing cycle. They are transported, for example, with the paper webs, pass through the papermaking machine and thus reach various places where they can cause unwanted deposits, particularly at pressing felts, drying wires, drying cylinders, smoothing rollers. In addition, they do of course also find their way into the finished paper and adversely affect its quality.

Accordingly, it is clear from the foregoing observations that, in principle, any parameters which promote the agglomeration of particles bring with them the danger of formation of secondary stickies. The pH value and the presence of certain papermaking auxiliaries are mentioned as two very important parameters in this regard. More specifically:

Small solid particles in contact with one another or separated from one another by only a very small space attract one another under the effect of molecular interactions, so-called Van der Waals forces. In general, however, the agglomeration-promoting Van der Waals forces are not developed in alkaline medium, i.e. in the medium typical of wastepaper recovery, because the particles are surrounded by an electrical double layer which is responsible for mutual repulsion of the particles of like charge. By contrast, papermaking machines are normally operated in a neutral or mildly acidic environment so that the repelling negative forces are reduced.

The drainage capacity of paper stock suspensions produced from wastepaper is generally poor. Accordingly, auxiliaries known as drainage or retention agents are frequently used in practice. Retention agents are understood by the expert to be substances which bind fine fibres and fillers to the long paper stock fibres (long fibres). This binding of the short fibres and fillers to the long fibres prevents the fine materials from forming a kind of fleece which complicates drainage of the paper stock suspension. Accordingly, retention agents improve the drainage capacity by binding the fine fibres to the long fibres.

Retention agents can be divided into three groups, namely: inorganic products, such as aluminium sulfate or sodium aluminate; synthetic products, such as polyethylene imines, polyamines or polyacrylamides; and modified natural products, such as cationic starch.

The mode of action of retention agents is based on the attachment of fine fibres and fillers to the paper fibres. An important mechanism in this regard is that polyelectrolytes of sufficient chain length can bridge the distance between two particles and, in this way, cause agglomeration. Thus, J. L. Hemmes et al. report that cationic polyelectrolytes, for example cationic starch, are suitable as trappers for anionic impurities (Wochenblatt für Papierfabrikation 1993, pages 163–170).

To sum up the situation, it may be said that, so far as experts are generally aware, a neutral or acidic medium on the one hand and the use of cationic auxiliaries on the other hand for drainage and retention displacement represent conditions which promote the agglomeration of particles. So far as the above-discussed problem of stickies is concerned, this means that the expert logically regards these conditions as beneficial to the formation of stickies.

Another key factor in the control of stickies is the temperature. The reason for this is that many adhesives belong to the thermoplastics (hotmelts) of which the tackiness increases with temperature.

In addition, the manifestation of the unwanted properties of stickies for the process of papermaking or processing is dependent on a number of parameters of which the detail is not yet sufficiently known (cf. H. L. Baumgarten, loc. cit., page V122, left-hand column). It is even possible that normally harmless impurities are converted into stickies through the cooperation of mechanical, chemical and thermal influences during the production process (cf. B. Brattka, Wochenblatt für Papierfabrikation 1990, pages 310 to 313).

Now, there are various known methods which represent attempts to counteract the manifestation of the negative properties of stickies for the process of papermaking. Particular significance is attributed in this regard to the principle of suppressing the deposition of stickies through the use of an auxiliary, so that the disruptions caused by the adhesive properties are reduced to a technically acceptable level. The processes based on this premise are referred to hereinafter as SDC processes ("stickies deposition control").

Thus, U.S. Pat. No. 4,923,566 describes a process in which stickies are controlled by urea.

According to the teaching of U.S. Pat. No. 3,081,219, stickies are controlled in the sulfite pulping of wood by the use of N-vinyl-2-pyrrolidone.

Attempts have also been made to control stickies by the addition of bentonites, diatomaceous earth and the like. This well known principle is based on the idea of introducing fine particles which are capable of binding stickies to their surface (cf. U.S. Pat. No. 3,081,219, column 1, lines 40 to 44). Another premise is based on the addition of sequestering agents, for example polyphosphates (cf. U.S. Pat. No. 3,081,219, column 1, lines 45 to 50). Finally, attempts have also been made to use various dispersants, for example the sodium salts of sulfonated formaldehyde/naphthalene condensates, although this gives rise to disadvantages at neutral pH values and leads to unwanted interactions with cationic auxiliaries (cf. U.S. Pat. No. 3,081,219, column 1, lines 51 to 58).

U.S. Pat. No. 4,744,865 describes an SDC process in which the coagulation of stickies is said to be reduced by methoxyfunctional polymers.

U.S. Pat. No. 4,871,424 relates to an SDC process using hydroxyfunctional polymers. However, only cellulose derivatives, such as hydroxypropyl methyl cellulose, and polyvinyl alcohol obtainable by hydrolysis or partial hydrolysis from polyvinyl acetate are specifically mentioned as polymers.

Finally, G. Galland and F. Julien Saint Amand report that primary acrylate stickies can be removed by flotation in alkaline medium and in the presence of soap (cf. EUR. Comm. Eur. Communities 14011, 1992, pages 235–243). From its very nature, however, this principle cannot assist in solving the problems caused by secondary stickies.

WO 01/01405 describes a process for recycling wastepaper in which alkoxylation products of OH-containing $C_{10-22}$ carboxylic acid derivatives and/or OH-containing $C_{10-22}$ carboxylic acids are used. According to WO 91/01405, the substances mentioned are suitable for deinking, i.e. for removing printing inks from wastepaper. However, the suitability of the substances for controlling the deposition of stickies from paper stock suspensions is neither disclosed nor suggested.

DESCRIPTION OF THE INVENTION

In overall terms, the prior art in the field under discussion is very heterogeneous and a totally satisfactory process for controlling stickies has yet to be developed. H. L. Baumgarten's observation still applies, namely: "It is clear from a glance at the problems caused by stickies in wastepaper that, in addition to manufacturers of wastepaper recovery plants, manufacturers of paper finishing and paper processing auxiliaries, which generally contain plastics, and the chemical industry as their supplier of raw materials have a responsibility to provide the paper industry with proper assistance" (Das Papier, 1984, No. 10A, page V124). Accordingly, there is a constant need for new or alternative solutions to the problem of controlling stickies in papermaking.

Accordingly, the problem addressed by the present invention was to provide a process for controlling the deposition of stickies in papermaking which would avoid the disadvantages of the prior art. This process would be generally applicable to the various types of stickies, but especially to pressure-sensitive adhesives, dispersion adhesives and hotmelts. In addition, the auxiliaries to be used in this process would be biologically safe and, accordingly, would satisfy ecological requirements which are now becoming increasingly important in the paper-processing industry. Finally, the problem addressed by the present invention would encompass in particular the problems presented by secondary stickies.

According to the invention, this problem has been solved by a process for controlling the deposition of stickies from paper stock suspensions in papermaking, in which 0.01 to 5.0% by weight, based on the pulp, of alkoxylation products obtainable by reaction of alkylene oxide with $C_{10-22}$ carboxyic acid derivatives and/or $C_{10-22}$ carboxylic acids containing carboxylic acid functions with at least one OH group in the 9, 10, 13 and/or 14 position is added to the paper stock suspensions.

Accordingly, the present invention relates to a process for controlling the deposition of stickies from paper stock suspensions in papermaking, characterized in that 0.01 to 5.0% by weight, based on the pulp, of alkoxylation products obtainable by reaction of alkylene oxides with $C_{10-22}$ carboxylic acid derivatives and/or $C_{10-22}$ carboxylic acids containing carboxylic acid functions with at least one OH group in the 9, 10, 13 and/or 14 position is added to the paper stock suspensions.

The process according to the invention may be generally applied to various types of stickies. However, it is particularly suitable for solving the problems caused by pressure-sensitive adhesives, dispersion adhesives and hotmelts.

In one preferred embodiment, the process according to the invention is applied to paper stock suspensions produced from wastepaper or from paper products containing wastepaper constituents.

The present invention also relates to the use of alkoxylation products obtainable by reaction of alkylene oxides with $C_{10-22}$ carboxylic acid derivatives and/or $C_{10-22}$ carboxylic acids containing carboxylic acid functions with at least one OH group in the 9, 10, 13 and/or 14 position for controlling the deposition of stickies from paper stock suspensions in papermaking.

In principle, the alkoxylation products to be used in accordance with the invention may be added at any point of the papermaking process. They are added either in liquid form or in the form of an aqueous solution. The necessary effective quantity of alkoxylation product depends on the extent to which the raw materials to be processed, i.e. wastepaper or papers containing wastepaper components, contain stickies. The alkoxylation products according to the invention are generally added in a quantity of 0.01 to 5.0% by weight and preferably in a quantity of 0.1 to 1.0% by weight, based on the pulp.

One preferred embodiment to the invention is characterized by the use of alkoxylation products which have been produced using ethylene oxide, propylene oxide and/or butylene oxide as the alkylene oxides.

The alkoxylation products to be used in accordance with the invention may be prepared by conventional organic synthesis methods. Suitable starting materials for alkoxylated OH-containing $C_{10-22}$ carboxylic acids are any OH-free unsaturated $C_{10-22}$ carboxylic acids of natural and/or synthetic origin with at least one or two double bonds in the 9 and/or 13 position, for example 9c-dodecenoic acid, 9c-tetradecenoic acid, 9c-hexadecenoic acid, 9c-octadecenoic acid, 9c,12c-octadecadienoic acid, 9t-octadecenoic acid, 9c, 12c, I 5c-octadecatrienoic acid, 9c-icosenoic acid, 13c-octadecenoic acid and/or mixtures with at least a high content of such unsaturated carboxylic acids. Preferred educts are $C_{16-22}$ carboxylic acids with at least one or two double bonds in the 9 and/or 11 position or carboxylic acid mixtures which have at least a high content of $C_{16-22}$ carboxyic acids containing at least one or two double bonds in the 9 and/or 13 position.

Suitable educts for alkoxylated OH-containing $C_{10-22}$ carboxylic acid derivatives are any OH-free, unsaturated, naturally occurring and/or synthetic $C_{10-22}$ carboxylic acid derivatives containing carboxylic acid functions with at least one or two double bonds in the 9 and/or 13 position. Examples of unsaturated carboxylic acids containing 10 to 22 carbon atoms are the carboxylic acids mentioned above. Unsaturated carboxylic acid derivatives containing $C_{16-22}$ carboxylic acid functions with at least one or two double bonds in the 9 and/or 13 position are preferred. Suitable unsaturated $C_{10-22}$ carboxylic acid derivatives are, for example, $C_{10-22}$ carboxylic acid esters, amides, mono- and/or di-$C_{1-4}$-alkylamides and/or mono- and/or di-$C_{1-4}$-alkanolamides. $C_{10-22}$ carboxylic acid alkyl esters containing 1 to 18 carbon atoms in the monohydric alcohol component and/or mono-, di- and/or triglycerides containing $C_{10-22}$ carboxylic acid functions with at least one or two double bonds in the 9 and/or 13 position are preferably used.

Examples of unsaturated $C_{10-22}$ carboxylic acid $C_{1-18}$ alkyl esters obtainable in known manner by esterification of the corresponding unsaturated carboxylic acids or by transesterification of the corresponding mono-, di- and/or triglycerides with $C_{1-18}$ alkyl alcohols, for example methanol, ethanol, propanol, butanol, isobutanol, 2-ethylhexanol, decanol and/or steayl alcohol, are palmitoleic acid methyl ester, oleic acid methyl ester, oleic acid ethyl ester, oleoc acid isobutyl ester, oleic acid-2-ethylhexyl ester and/or oleic acid decyl ester and/or $C_{10-22}$ carboxylic acid $C_{1-18}$ alkyl ester mixtures with at least a high content of such OH-free unsaturated $C_{10-22}$ carboxylic acid $C_{1-18}$ alkyl esters containing at least one or two double bonds in the 9 and/or 13 position of the carboxylic acid, such as palm oil methyl ester, soybean oil methyl ester, rapeseed oil methyl ester and/or tallow fatty ethyl ester. Suitable mono-, di- and/or triglycerides of OH-free unsaturated $C_{10-22}$ carboxylic acids containing at least one or two double bonds in the 9 and/or 13 position are, in particular, fats and/or oils of natural origin off which the carboxylic acid content is made up predominantly of unsaturated $C_{10-22}$ carboxylic acids containing at least one or two double bonds in the 9 and/or 13 position, preferably predominantly of unsaturated $C_{16-22}$ carboxylic acids with at least one or two double bonds in the 9 and/or 13 position, such as olive oil, linseed oil, sunflower oil, safflower oil, soybean oil, peanut oil, cottonseed oil, high-erucic and/or low-erucic rapeseed oil, palm oil, lard and/or tallow.

The unsaturated $C_{10-22}$ carboxylic acid derivatives and/or unsaturated $C_{10-22}$ carboxylic acids are epoxidized, for example, by the process described in DE-PS 857 364, i.e. by reaction with peracetic acid in the presence of acidic catalysts or with performic acid formed in situ from formic acid and hydrogen peroxide. The iodine values of the epoxidation products are below 20 and, more particularly, below 15. The method of choice for determining the iodine value is basically of secondary importance. For the purposes of the present invention, however, reference is specifically made to the methods developed by Hanus and Wijs, which have long been part of Department C-V of the "DGF-Einheitsmethoden", and to the more recent equivalent method developed by Fiebig (cf. Fat Sci. Technol. 1991, No. 1 pages 13 to 19).

The oxirane rings of the epoxidized carboxylic acid derivatives and/or carboxylic acids are then opened by reaction with hydrogen or protic compounds, such as water, $C_{1-18}$ alkyl and/or $C_{1-18}$ alkenyl alcohols or saturated and/or unsaturated $C_{1-22}$ carboxylic acids, to form hydroxy groups. The ring opening conditions are selected so that the acid derivative groups and acid groups present remain intact.

The hydrogenation of epoxidized carboxaylic acid derivatives and/or epoxidized carboxylic acids may be carried out, for example, by the process described in DE-OS 20 21 530 in the presence of catalysts based on heavy metals of the VIIIth group of the periodic system at temperatures of 100 to 250° C. and under hydrogen pressures of $10^6$ to $5·10^6$ Pa.

The reactions of epoxidized carboxylic acid derivatives and/or epoxidized carboxylic acids with protic compounds may be carried out by the method described in M. S. Malinovskii: "Epoxides and Their Derivatives", Sivon Press, 1965 at temperatures of 50 to 200° C. and under pressures of $10^5$ to $10^6$ Pa. The opening of the oxirane rings with linear and/or branched $C_{1-18}$ alkyl and/or $C_{2-18}$ alkenyl alcohols and preferably with linear or branched $C_{1-6}$ alkyl alcohols is preferably carried out in the presence of acidic catalysts, for example sulfuric acid or p-toluene sulfonic acid.

The carboxylic acid derivatives and carboxylic acids containing carboxylic acid functions with at least one OH group in the 9, 10, 13 and/or 14 position obtainable by opening of the oxirane rings are then alkoxylated by known industrial methods with one or more alkylene oxides, preferably with ethylene oxide, propylene oxide and/or butylene oxide, at temperatures of 100 to 200° C. and preferably at temperatures of 140 to 180° C. under pressures of $10^5$ to $2·10^6$ Pa and preferably under pressures of $3·10^5$ to $5·10^5$ Pa (cf. for example "Chemische Technologie", Vol. 7, pages 131 to 132, Carl-Hanser-Verlag, München/Wien (1986)). The alkylene oxide content of the alkoxylated OH-containing carboxylic acid derivatives and/or carboxylic acids is between 2 and 400% by weight and preferably between 40 and 70% by weight, based on the non-alkoxylated compounds.

The following Examples are intended to illustrate the invention without limiting it in any way.

EXAMPLES

1. Substances Used 1.1 Production of Ethoxylated, OH-containing Soybean Oil from Hydrogenated Soybean Oil Epoxide (Soybean Oil—EO I)

20 kg of epoxidized soybean oil (approximate fatty acid composition: 8% by weight palmitic acid, 4% by weight stearic acid, 28% by weight oleic acid, 53% by weight linolenic acid and 6% by weight linoleic acid; epoxide content=6.78% by weight; iodine value=5; acid value=0.4) and 0.2 kg of a nickel catalyst (support: kieselguhr) were introduced into an autoclave, the air present in the autoclave was displaced by purging with nitrogen and the contents of the autoclave were hydrogenated at 150 to 170° C. under a hydrogen pressure of $2·10^6$ Pa until there was no further uptake of hydrogen (about 6 hours). After cooling and removal of the catalyst, colorless hydrogenated soybean oil epoxide with an OH value (OHV) of 165.8, a saponification value (SV) of 181.4, an iodine value (IV) of 8.3 and an acid value (AV) of 1 was obtained in a yield of 20 kg.

After the addition of 5.0 g of a 30% by weight solution of potassium hydroxide in methanol, 650 g of the hydrogenated soybean oil epoxide were heated to 100° C. in an autoclave. The traces of methanol present were removed at that temperature by 5× evacuation and purging with nitrogen. After the reaction temperature had been increased to 150° C., a total of 308 g of ethylene oxide was added in portions so that the pressure in the reactor did not exceed $5·10^5$ Pa. On completion of the reaction, the reaction mixture was cooled to about 90° C. and the reactor was evacuated for about 15 minutes to remove traces of ethylene oxide still present. A clear yellow liquid with an OHV of 124.5 was obtained.

1.2. Production of Ethoxylated and Propoxylated OH-containing Soybean Oil from Hydrogenated Soybean Oil Epoxide (Soybean Oil—EO/PO I)

After the addition of 6.2 g of a 30% by weight solution of potassium hydroxide in methanol, 371 g of the soybean epoxide hydrogenated in accordance with Example 1.1. were reacted first with 440 g of ethylene oxide and then—in the same reactor—with 232 g of propylene oxide under the same conditions as in Example 1.1. After removal of the traces of propylene oxide in vacuo and neutralization of the catalyst with 3.3 g of lactic acid, a golden yellow liquid with an OHV of 72.1 was obtained.

1.3. Production of Ethoxylated OH-containing Linseed Oil from Hydrogenated Linseed Oil Epoxide (Linseed Oil—EO I)

As in Example 1.1., 1200 g of epoxidized linseed oil (approximate fatty acid composition: 5% by weight palmitic acid, 4% by weight stearic acid, 22% by weight oleic acid, 17% by weight linoleic acid and 52% by weight linoleic acid; epoxide content: 8.9% by weight; iodine value=10; acid value=0.7) and 15 g of a nickel catalyst (support: kieselguhr) were introduced into an autoclave, the air present in the autoclave was displaced by purging with nitrogen and the contents of the autoclave were hydrogenated at 150 to 170° C. under a hydrogen pressure of $2·10^6$ Pa until there was no further uptake of hydrogen. After cooling and removal of the catalyst, colorless hydrogenated linseed oil epoxide with an OHV of 202.6, an SV of 178.2, an IV of 16.9 and an AV of 0.7 was obtained.

650 g of the hydrogenated linseed oil epoxide were reacted with 308 g of ethylene oxide as in Example 1.1. A yellow liquid with an OHV off 152 was obtained.

1.4. Production of Ethoxylated OH-containing Soybean Oil from Soybean Oil Epoxide Reacted with Methanol (Soybean Oil—EO II)

2360 g (10 moles) of epoxidized soybean oil (same characteristics as in Example 1.1.) were added dropwise with intensive cooling to a refluxed solution of 9 g (0.9 g/mole epoxide) of concentrated sulfuric acid in 960 g (30 mole) of methanol. After the epoxide had been added and reacted off, the reaction mixture was neutralized with diethyl ethanolamine and excess methanol was removed in vacuo. A clear yellow liquid with an OHV of 165, an SV of 163, an IV of 19.4 and an AV of 1.6 was obtained.

After the addition of 7.5 g of a 30% by weight solution of sodium methylate in methanol, 510 g of the ring opening product of soybean oil epoxide with methanol were reacted with 551 g of ethylene oxide at 175° C. under the same conditions as in Example 1.1. After removal of the traces of ethylene oxide in vacuo, a red-brown liquid with an OHV of 110.6 was obtained.

1.5. Production of Ethoxylated and Propoxylated OH-containing Soybean Oil from Soybean Oil Epoxide Reacted with Methanol (Soybean Oil—EO/PO II)

After the addition of 7.5 g of a 30% by weight solution of sodium methylated in methanol, 510 g of the ring opening product of soybean oil epoxide with methanol from Example 1.4. were reacted first with 551 g of ethylene oxide and then—in the same reactor—with 290 g of propylene oxide under the same conditions as in Examples 1.1. and 1.2. After removal of the traces of propylene oxide in vacuo, a brown-yellow almost clear liquid with an OHV of 94.9 was obtained.

1.6 Production of Ethoxylated OH-containing Soybean Oil from Soybean Oil Epoxide Reacted with Carboxylic Acids (Soybean Oil—EO III)

126 kg (805 moles) of a mixture of saturated fatty acids (60% by weight octanoic acid, 35% by weight decanoic acid, 3% by weight dodecanoic acid and 2% by weight hexanoic acid; AV=361.9, IV<1) and 180 kg (766 moles) of epoxidized soybean oil (same characteristic data as in Example 1.1.) were introduced into a stirred tank reactor and heated with stirring to 170° C. When the reaction mixture contained no more epoxide groups (about 4 hours), it was distilled in vacuo up to a temperature of about 190° C. A dark yellow liquid with an OHV of 84.6, an SV of 239 and an AV of 2.4 was obtained.

After addition of 6.9 g of a 30% by weight solution of potassium hydroxide in methanol, 423 g of the reaction product of soybean oil epoxide with carboxylic acids were reacted with 660 g of ethylene oxide at 140° C. under the same conditions as in Example 1.1. After removal of the traces of ethylene oxide in vacuo and neutralization with lactic acid, a dark yellow liquid with an OHV of 54.7 was obtained.

2. Carrying Out the Tests for Controlling Stickies from Paper Stock Suspensions

2.1. Principle of the Method

The consistency of the sample to be investigated is first determined using a nutsch sheet. Subsequent weighing in for determining the sticky area is based on 2 g of bone dry stock. The stock sample is then diluted with tap water to a consistency of 1% and sorted in a Haindl fractionator with a slot width of 0.15 mm. The quantity of washing water is adjusted to 10 l/min. for a pressure of 1.7 to 2.0 bar. For a stroke frequency of 200/min., the total sorting time is 15 minutes. The fiber-free residue is then rinsed off the slotted plate and filtered under suction through a membrane filter (diameter 5 cm) in highly diluted form. Four filters are used for this purpose to stop the stickies from agglomerating. The filters with the sticky residue are distributed over a cover sheet for Rapid-Köthen sheets (sticky surface facing upwards) and covered with black photographic board. After preliminary drying in a sheet former (10 mins. at 95° C.), the covered filters are placed between two steel plates and subjected to a specific load per unit area by tightening screw clamps before heating for 2 minutes at 133° C. in a drying cabinet. The sticky area on the photographic board is then evaluated using a DOT counter, version 2.0. The sticky area of particles larger than 0.05 mm in size is determined in $mm^2$/kg bone dry stock.

2.2. Particulars of the Test Procedure

The tests were carried out in pilot plant with the following construction:

High-consistency pulper → fibrizer/sorter → 1st flotation → cleaner → thickening → disperser → 2nd flotation → paper machine The alkoxylation product according to the invention of Example 6 was continuously introduced into the process in various concentrations before the disperser.

Effectiveness was determined via the sticky area by comparison with the blank test after sorting in the Haindl fractionator. The samples were taken from the headbox of the paper machine.

TABLE 1

| Substance tested: product of Example 1.6. | |
|---|---|
| Concentration (%) | Sticky area ($mm^2$/kg bone dry stock) |
| 0.01 | 2.5 |
| 0.1 | 1.8 |
| 1 | 1.2 |
| 3 | 1.1 |
| 5 | 1.0 |
| No addition | 2.8 |

2.3. Discussion

It can be seen from Table 1 that the agglomeration and deposition of secondary stickies can be significantly improved in relation to the blank test by adding the alkoxylation products to be used in accordance with the invention.

What is claimed:

1. The process of controlling the deposition of stickies from paper stock suspensions during papermaking comprising adding to said paper stock suspensions from about 0.001% to about 5.0% by weight, based on the weight of fibrous paper stock, of alkoxylation products obtained by reaction of alkylene oxides with $C_{10\text{-}22}$ carboxylic acid derivatives or $C_{10\text{-}22}$ carboxylic acids containing carboxylic acid functional groups with at least one OH group in the 9, 10, 13 or 14 position.

2. A process as in claim 1 wherein said paper stock suspensions are prepared from wastepaper or from paper products containing wastepaper constituents.

3. A process as in claim 1 wherein said alkylene oxides are selected from the group consisting of ethylene oxide, propylene oxide and butylene oxide.

4. A process as in claim 1 wherein said alkoxylation products contain from about 2% to about 400% by weight of said alkylene oxides, based on the weight of said carboxylic acids or said carboxylic acid derivatives.

5. A process as in claim 1 wherein said carboxylic acids and said carboxylic acid derivatives contain 16 to 22 carbon atoms in the carbon chain of the carboxylic acid.

6. A process as in claim 1 wherein said alkoxylation products comprise alkoxylated OH-containing carboxyic acid alkyl esters containing 1 to 18 carbon atoms in the monohydric alcohol component.

7. A process as in claim 1 wherein said alkoxylation products comprise alkoxylated mono-, di- or tri-glycerides containing OH-functional carboxylic acids.

8. A process as in claim 7 wherein said mono-, di- or tri-glycerides contain $C_{10\text{-}22}$ carboxylic acid functional groups with at least one or two double bonds in the 9 or 13 position.

9. A process as in claim 1 wherein said stickies comprise wood rosin.

10. A process as in claim 1 wherein said stickies comprise adhesives selected from pressure-sensitive adhesives, dispersion adhesives and hotmelt adhesives.

* * * * *